(12) United States Patent
Johnson

(10) Patent No.: US 11,627,754 B2
(45) Date of Patent: Apr. 18, 2023

(54) PIT DETECTION IN PROCESSED FRUIT

(71) Applicant: Gary Edgar Johnson, Sunnyside, WA (US)

(72) Inventor: Gary Edgar Johnson, Sunnyside, WA (US)

(73) Assignee: JOHNSON FOODS, INC., Sunnyside, WA (US)

( * ) Notice: Subject to any disclaimer, the term of this patent is extended or adjusted under 35 U.S.C. 154(b) by 289 days.

(21) Appl. No.: 16/988,587

(22) Filed: Aug. 7, 2020

(65) Prior Publication Data

US 2021/0037875 A1 Feb. 11, 2021

Related U.S. Application Data

(60) Provisional application No. 62/884,152, filed on Aug. 7, 2019.

(51) Int. Cl.
*A23N 4/06* (2006.01)
*G01G 19/00* (2006.01)
*G06T 7/00* (2017.01)

(52) U.S. Cl.
CPC ............... *A23N 4/06* (2013.01); *G01G 19/00* (2013.01); *G06T 7/0004* (2013.01)

(58) Field of Classification Search
CPC ... A23N 4/06; A23N 4/02; A23N 4/04; G01G 19/00; G06T 7/0004
See application file for complete search history.

(56) References Cited

U.S. PATENT DOCUMENTS

| 9,084,437 B1 * | 7/2015 | Pierce | A23N 4/02 |
| 2021/0037875 A1 * | 2/2021 | Johnson | A23N 4/06 |
| 2021/0315252 A1 * | 10/2021 | Crescenzo | B26D 3/30 |

* cited by examiner

*Primary Examiner* — Omar Flores Sanchez
(74) *Attorney, Agent, or Firm* — Gregory G. Johnson; Armstrong Teasdale LLP

(57) ABSTRACT

This disclosure describes a systems and methods to determine the presence of pits or pit fragments in a piece of fruit that has undergone a pitting process.

20 Claims, 4 Drawing Sheets

PIT DETECTION IN PROCESSED FRUIT

CROSS-REFERENCE TO RELATED APPLICATION

This application claims priority to U.S. Provisional Patent Application No. 62/884,152 titled "Pit Detection in Processed Fruit", filed on Aug. 7, 2019, the entire disclosure of which is hereby incorporated by reference in its entirety.

BACKGROUND

Various fruits contain pits. However, unlike fruits that are sold in fresh markets, fruit that frozen or canned, is typically "pitted" or otherwise processed in order to have the pit removed prior to packaging the fruit for subsequent sale. However, detecting whether a pit has actually been removed from a piece of fruit is a labor-intensive process.

It is with respect to these and other general considerations that examples have been described. Also, although relatively specific problems have been discussed, it should be understood that the examples should not be limited to solving the specific problems identified in the background.

SUMMARY

This disclosure generally relates to detecting whether a pit has been removed from a piece of fruit, such as, for example a cherry. Although a cherry is specifically mentioned, the concepts described herein may be used to detect the presence and/or absence of a pit from any type of fruit. For example, once any type of fruit containing a pit (e.g., peach, plum, olive, date, etc.) has undergone a machine pitting process, the concepts described herein may be used to detect or otherwise determine whether the pit has been completely removed from the piece of fruit.

Accordingly, aspects of the present disclosure describe a method for detecting whether a piece of fruit contains a pit. For example, after the piece of fruit has undergone a fruit pitting process, the piece of fruit is received in a receptacle. In some cases, the receptacle includes or is otherwise associated with at least one actuation mechanism. The actuation mechanism automatically changes a position of the piece of fruit from a first position to a plurality of different positions as the piece of fruit is within the receptacle. As the piece of fruit is being moved from one position of the plurality of positions to another position of the plurality of positions, image data of the piece of fruit is captured. The captured image data is used to determine an estimated size and/or weight of the piece of fruit. In some cases, the estimated size and/or weight of the piece of fruit includes the estimated weight of the piece of fruit prior to the piece of fruit undergoing the fruit pitting process. That is, the estimate weight of the piece of fruit includes the estimated weight of the piece of fruit and the pit. Once the estimated weight of the piece of fruit has been determined, a weighing mechanism associated with the receptacle is used to determine an actual weight of the piece of fruit. As used herein, the actual weight of the piece of fruit is the actual weight of the piece of fruit after the piece of fruit has undergone the fruit pitting process. A determination is then made, using the difference between the actual weight of the piece of fruit and the estimated weight of the piece of fruit, whether the piece of fruit contains the pit.

Also described is a system for detecting whether a processed piece of fruit contains a pit. The system includes at least one processor and a memory coupled to the at least one processor. The memory stores instructions that, when executed by the at least one processor, perform operations. For example, the system is operable to receive image data of a piece of fruit as the piece of fruit is contained in a receptacle. An estimated weight of the piece of fruit is then determined using the image data. The actual weight of the piece of fruit is then received from a weighing mechanism associated with the receptacle. The system may then determine, using a difference between the actual weight of the piece of fruit and the estimated weight of the piece of fruit, whether the piece of fruit contains a pit.

The present disclosure also describes a method for detecting the presence of a pit in a piece of fruit that has undergone a fruit pitting process. This method includes receiving a plurality of images of the piece of fruit as the piece of fruit is contained in a receptacle. The plurality of images are used to determine an estimated weight of the piece of fruit. An actual weight of the piece of fruit is then determined using a weighing mechanism associated with the receptacle. A determination may then be made as to whether the piece of fruit contains the pit using a difference between the actual weight of the piece of fruit and the estimated weight of the piece of fruit.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
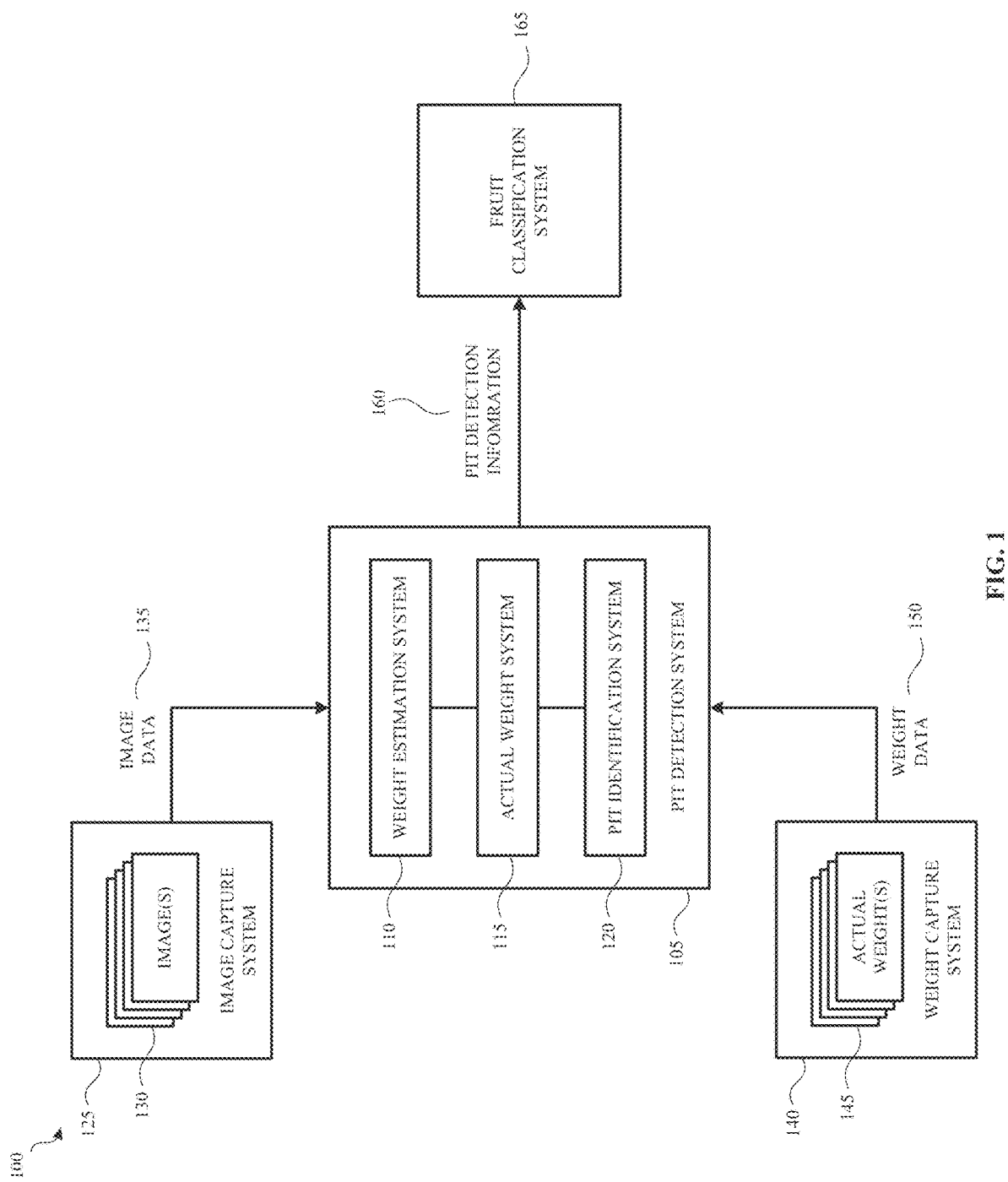
FIG. 1 illustrates a system for detecting whether a pit has been removed from a piece of fruit according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Many fruits, such as cherries, olives, peaches, etc., contain pits. When these fruits are sold on the fresh market, the consumer, typically a person buying the fruit at a supermarket, fruit stand or the like, expects or knows that the fruit should or will contain a pit. For example, if the person buys a bag of fresh cherries from the supermarket, the person knows that each cherry will contain a pit.

However, not all fruits that contain pits are sold on the fresh market. In some cases, these fruits may be processed or pitted, packaged and/or frozen and provided to various food manufacturers. These food manufacturers require that the pits are entirely removed from each piece of fruit. For example, a warehouse may specialize in pitting fresh cherries. Once the cherries are pitted (typically using a pitting machine), the cherries are packaged, frozen and subsequently sold to other food manufacturers. These other food manufacturers may use the cherries to create cherry yogurt, cherry ice cream and other food items.

In some cases, cherries are pitted using machines that "punch" the pit out of a cherry. The cherry remains relatively whole during the process while the pit is pushed out through the bottom of the cherry. Once the cherry is pitted, the cherries continue down a manufacturing line for further processing (e.g., the cherries are packaged, frozen and subsequently sold).

However, because the pitting process is done by a pitting machine and a typical pitting machine may pit approximately 1800 pounds of cherries per hour, it is possible that a pit is only partially removed from a cherry, a pit is still contained in a cherry and/or the punching process of the machine cracks or breaks the pit and one or more fragments of the pit remain in the cherry.

Accordingly, aspects of the present disclosure describe how to automatically determine whether a pit has been completely removed from a piece of fruit that was pitted by a pitting machine. For example, aspects of the present disclosure describe how to automatically determine, without human intervention, whether a piece of fruit, such as a cherry, contains a pit or a pit fragment after undergoing a machine-based pitting process.

The pit detection process is as follows. Once a piece of fruit passes through a pitting machine, the piece of fruit is placed in or is otherwise received into a receptacle. In some cases, each receptacle will house a single piece of fruit. The receptacle may be one of many receptacles on a conveyor. For example, the conveyer may be comprised of multiple rows of receptacles with each row containing a specific number (e.g., ten) of individual receptacles. Additionally, each receptacle in each of the rows may contain an individual piece of fruit.

The conveyor passes through a series of cameras or other image capture devices. The cameras will capture multiple images of each piece of fruit in each of the receptacles while the piece of fruit is moved or rotated within the receptacle. The captured image data will be used to determine the size and/or weight of the piece of fruit.

For example, once the size of the piece of fruit is determined, the weight of each piece of fruit in each receptacle will be estimated. The estimated weight of the piece of fruit includes the estimated weight of the piece of fruit including the pit. That is, the weight of the piece of fruit is estimated as if the pit were still in the piece of fruit. In some instances, the estimated weight of the piece of fruit may be based, at least in part, on previously gathered weight data of different sizes of pieces of fruit of similar types. The previously gathered weight data includes pieces of fruit that contain a pit, including pieces of fruit that have been run through a pitter but still have a pit in them.

The actual weight of the piece of fruit will also be taken or received using a weight mechanism (e.g., a load cell, a scale etc.) that is associated with each receptacle. The difference between the estimated weight of the piece of fruit and the actual weight of the piece of fruit may be used to determine whether the pit is still in the piece of fruit. For example, the difference between the actual weight of the piece of fruit and the estimated weight of the piece of fruit may be compared against a weight difference threshold. If the difference between the actual weight of the piece of fruit and the estimated weight of the piece of fruit is above the weight difference threshold, it may be determined that the pit has been completely removed from the piece of fruit. As such, the piece of fruit may continue down the conveyer for further processing.

However, if it is determined that the difference between the actual weight of the piece of fruit and the estimated weight of the piece of fruit is below the weight difference threshold, it may be determined that the pit or a pit fragment is still in the piece of fruit. As such, the piece of fruit may be ejected from the receptacle.

For example, once a cherry has passed through a pitting machine, the cherry may be placed or otherwise received in a receptacle. One or more actuation mechanisms in, or otherwise associated with, the receptacle may be used to rotate or otherwise move the cherry within the receptacle. This enables the series of cameras to capture various images of the cherry from a number of different angles or positions. The captured images will then be used to determine a size and/or weight of the cherry.

For example, the size data may be used to estimate the weight of the cherry. The estimated weight of the cherry will then be compared to the actual weight of the cherry. The actual weight of the cherry is received or otherwise determined from a weighing mechanism integrated or otherwise associated with the receptacle. The difference between the estimated weight of the cherry and the actual weight of the cherry is used to determine whether the pit has been removed from the cherry.

For example, if it is determined that the actual weight of the cherry is fifteen percent less than the estimated weight of the cherry, the system may determine that the cherry no longer has a pit. As such, the cherry may proceed down the conveyer for further processing. However, if the actual weight of the cherry is about the same as the estimated weight of the cherry, the system may determine that the cherry still has a pit and ejects the cherry from the receptacle.

Although a specific percentage has been indicated, the percentage of weight difference (referred to herein as the weight difference threshold) between the estimated weight of the piece of fruit and the actual weight of the piece of fruit may differ based, at least in part, on any number of factors. These factors may include, among others, growing conditions (e.g., environmental conditions in the area in which the piece of fruit was grown) associated with the piece of fruit, time of season in which the piece of fruit was grown, the estimated or actual amount of moisture in the piece of fruit, the amount of sugar in the piece of fruit etc.

These and other concepts will be described in greater detail below with respect to FIGS. 1-3.

FIG. 1 illustrates a system 100 for detecting whether a pit has been removed from a piece of fruit according to an example. In some examples, the system 100 may be combined, integrated or otherwise associated with a pitting machine. For example, the pitting machine may be used to remove pits from individual pieces of fruit. The system 100 may be used to subsequently determine whether the pit has been removed from the piece of fruit, whether the pit is still in or partially in the piece of fruit and/or whether the piece of fruit contains a pit fragment.

The system 100 includes a pit detection system 105. The pit detection system 105 receives data from other systems and uses the data to determine whether the pit has been removed from the piece of fruit. As shown in FIG. 1, the pit detection system 105 includes a weight estimation system 110, an actual weight system 115 and a pit identification system 120.

In some examples, the weight estimation system 110 is used to determine an estimated weight of each piece of fruit that is analyzed by the pit detection system 105. For example, once a piece of fruit exits the pitting machine, the piece of fruit is placed in a receptacle (see for example, receptacle 220 (FIG. 2)) of a conveyor. As the receptacle moves along the conveyor, an image capture system 125 captures one or more images 130 of the piece of fruit. In some examples, each image of the one or more images 130 is an image of the piece of fruit from a different angle or perspective. For example, a first image may be of the top portion of the piece of fruit, a second image may be of a bottom portion of the piece of fruit, a third image may be a side portion of the piece of fruit and so on. In some example, the image capture system 125 may capture up to sixty-four different images (or more) of each piece of fruit as the receptacle moves along the conveyor.

In order to capture each of the different images 130, the receptacle may include or otherwise be associated with an actuation mechanism. The actuation mechanism (e.g., a rolling mechanism, rolling mechanisms or other positioning mechanism) moves or otherwise positions the piece of fruit at different resting positions within the receptacle. Thus, different cameras or other image capture devices of the image capture system 125 may be able to capture the different images 130 such as previously described.

Once the images 130 have been captured, the image capture system 125 provides the image data 135 to the weight estimation system 110 of the pit detection system 105. In some examples, the image capture system 125 provides the image data 135 to the weight estimation system 110 after each image 130 is captured. In other examples, the image data 135 is provided to the weight estimation system 110 once all images of a particular piece of fruit have been captured. In yet another example, the weight estimation system 110 may request the image data 135 from the image capture system (e.g., in response to the pit detection system 105 instructing the weight estimation system 110 to request the image data 135).

The weight estimation system 110 uses the image data 135 from the capture images 130 to estimate the size and/or weight of the piece of fruit. That is, the weight estimation system 110 is configured to estimate the weight of the piece of fruit with the pit still included (e.g., prior to the piece of fruit undergoing the pitting process). For example, the estimated weight includes the estimated weight of the piece of fruit including the pit—although the pit should have already been removed from the piece of fruit by the pitting machine.

In some cases, the weight estimation system 110 uses the image data 135 to determine the size of the piece of fruit. The size of the piece of fruit may then be used to determine the estimated weight of the piece of fruit. Although the size of the piece of fruit is specifically mentioned, other factors included in the image data 135 may be used to estimate the weight of the piece of fruit. For example, the color and/or shape of the piece of fruit may affect the weight of the piece of fruit. As such, the weight estimation system 110 may use various types of information contained in the image data 135 to determine an estimated weight of the piece of fruit.

The weight estimation system 110 may also use previously collected weight data in order to more accurately estimate the weight of the piece of fruit. For example, the weight estimation system 110 may have collected or otherwise received actual weight(s) about similarly colored, shaped and/or sized pieces of fruit with pits. This information may then be compared against the image data 135 of the piece of fruit to accurately estimate the weight of the piece of fruit.

The weight estimation system 110 may also receive weight estimation adjustments in real-time or substantially real-time. For example, the size and associated weight of some fruit in one lot may have different sizes and weights from fruit in a different lot. The differences may be based on a number of different factors including the time of season, the geographic area in which the fruit was grown, the amount of moisture in the fruit, the amount of sugar in the fruit and so on. These factors, when know and provided to the system 100 may be used to adjust weight estimates as needed.

As briefly discussed above, the pit detection system 105 may also include an actual weight system 115. The actual weight system 115 receives weight data 150, that indicates or otherwise specifies the actual weight 145 of individual pieces of fruit, from a weight capture system 140. In some cases, the weight capture system 140 is associated with or is otherwise included with the receptacle that receives the piece of fruit once the piece of fruit has been pitted by the pitting machine. Thus, once the piece of fruit has been pitted, the weight capture system 140 measures the actual weight 145 of each piece of fruit. The weight data 150 is then provided to the actual weight system 115.

Although the actual weight is taken after the piece of fruit has been pitted by a pitting machine, it is possible that the pit was not entirely removed from the piece of fruit or the impact by the machine on the pit caused the pit to fracture or break. Thus, it is possible that the actual weight of the piece of fruit is: 1) the weight of the piece of the fruit without the pit, 2) the weight of the piece of fruit with the pit, or 3) the weight of the piece of fruit with one or more pit fragments. Regardless and as will be described below, the pit detection system 105 may be used to accurately determine whether a pit has been completely removed from the piece of fruit.

Although the above disclosure describes that the actual weight of the piece of fruit is taken after the pit has been removed, the system 100 may also be configured to weigh each individual piece of fruit prior to the pit being removed. For example, a receptacle may be configured to receive a piece of fruit. Once received, a weight of the piece of fruit, along with the pit, may be measured. The receptacle may then be fed through the pitting machine that removes the pit. The weighing mechanism associated with the receptacle may then be used to measure the post-pitted weight of the individual cherry.

Once the estimated weight of the piece of fruit and the actual weight of the piece of fruit has been determined, the pit identification system 120 may use the difference between the estimated weight of the piece of fruit and the actual weight of the piece of fruit to determine whether the pit was successfully and/or completely removed from the piece of fruit. For example, if the actual weight of the piece of fruit is fifteen percent lower than the estimated weight of the piece of fruit, the pit identification system 120 may determine that the pit was successfully removed from the piece of fruit.

Although a weight difference of fifteen percent is specifically mentioned, the pit identification system 120 may use any threshold difference (or range of threshold differences) between the estimated weight and the actual weight to determine whether the pit was successfully removed. If the weight difference is less than a particular threshold, the pit identification system 120 may determine that the pit has not been entirely removed from the piece of fruit.

In some cases, the pit identification system may also use the images 130 to further detect whether a pit has been removed from a piece of fruit—especially in those cases where the weight difference between the estimated weight and the actual weight is below the threshold. For example and as described above, the image capture system may capture various images of the piece of fruit. Those images may be analyzed by the pit identification system 120 to determine whether or not the piece of fruit contains a pit or pit fragment. That is, each image may be analyzed, using an image recognition, to determine whether the image contains a pit or pit fragment.

In some cases, the pit identification system 120 may be automatically updated or calibrated in real-time or substantially real-time based, at least in part, on the number false positives (e.g., the system 100 indicates that a piece of fruit still contains a pit or pit fragment when it really does not) or false negatives (e.g., the system 100 indicates that a piece of fruit does not contain a pit or pit fragment when it really does). For example, if the pit detection system 105 receives data or other information that too many pieces of fruit are not being rejected by the system 100 (e.g., the pit detection system 105 is not accurately detecting whether the piece of fruit still contains a pit) due to the piece of fruit containing a pit, or too many pieces of fruit are being rejected from the system for containing a pit, when the pit has actually been removed, the pit identification system 120 may change a weight difference threshold that is used to determine whether the piece of fruit contains a pit. The weight difference threshold is based, at least in part, on the difference between the actual weight of the piece of fruit and the estimated weight of the piece of fruit.

For example, if the pit identification system 120 previously determines that, based on the size of the piece of fruit and/or the type of the piece of fruit, that the pit of the piece of fruit should be approximately fifteen percent of the actual weight of the piece of fruit but the received data indicates that the actual weight of the pit is approximately twelve percent of the actual weight of the piece of fruit, the pit identification system 120 may automatically adjust the weight difference threshold to the new amount.

In some cases, this change may be done automatically. For example, if the fruit classification system 165 has over a threshold number of false positives and/or false negatives in a set amount of time (e.g., one per minute, ten per hour, etc.), the weight difference threshold may be adjusted by the pit detection system 105. In some cases, the false positive and false negative information may be determined automatically, and subsequently used by the pit identification system 120 to self-correct and/or adjust the weight difference threshold. In other cases, this may be a manual process. In yet other examples, the detection of false negatives and/or false positives and the adjustment to the weight difference threshold may be a combination of a manual process and an automatic process.

Once the difference between the estimated weight of the piece of fruit and the actual weight of the piece of fruit is determined, this information (shown as pit detection information 160) is provided to a fruit classification system 165.

The fruit classification system 165 uses the pit detection information 160 to determine whether the piece of fruit should be allowed to continue down the conveyor for further processing.

For example, if the pit detection information 160 indicates that a particular piece of fruit still contains a pit or pit fragment, the fruit classification system 165 causes the piece of fruit to be ejected from the receptacle. In some cases, if it is determined that a piece of fruit still has a pit, that piece of fruit is ejected from the receptacle and place on a different conveyor. However, if the pit detection information indicates that the piece of fruit if pit free, the fruit classification system 165 allows the piece of fruit to remain in the receptacle (or provided to a different conveyor) and subjected to further processing.

Figure 2:
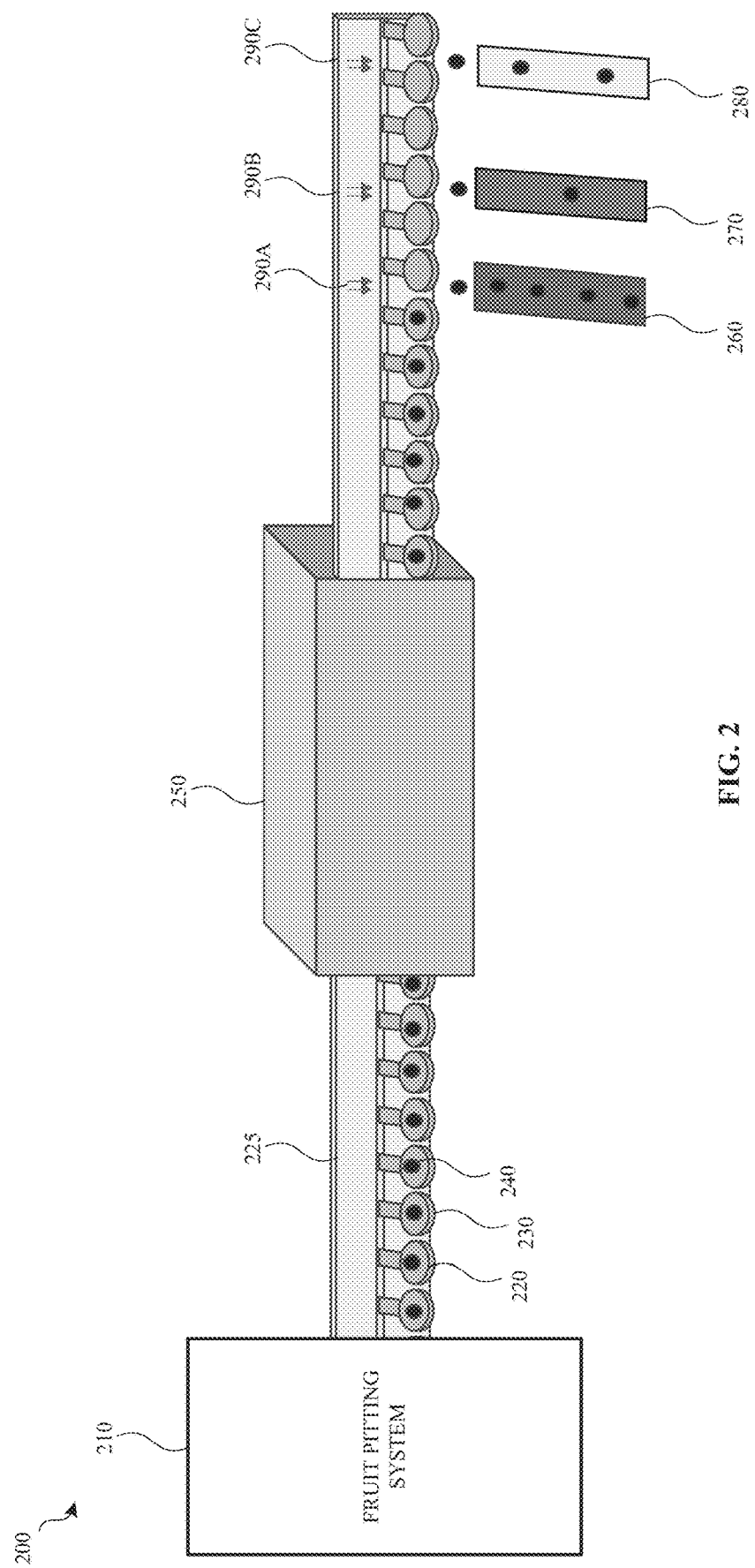
FIG. 2 illustrates another example system for detecting whether a pit has been removed from a piece of fruit according to an example.

FIG. 2 illustrates another example system 200 for detecting whether a pit has been removed from a piece of fruit 240 according to an example. In some examples, the various systems described above with respect to FIG. 1 may be used, associated or otherwise integrated with the various components of the system 200 shown and described with respect to FIG. 2.

The system 200 includes a fruit pitting system 210. The fruit pitting system 210 may be used to automatically remove pits from various individual pieces of fruit as each piece of fruit passed through the fruit pitting system. For example and as described above, the fruit pitting system 210 may be a machine that punches the pit out of a piece of fruit. The piece of fruit remains relatively whole during the process while the pit is pushed out through the bottom of the piece of fruit. Although a punch pitting machine is expressly recited, the fruit pitting system 210 may be any type of machine that is used to remove a pit from a piece of fruit.

Once the piece of fruit (e.g., piece of fruit 240) has been pitted, the piece of fruit 240 is placed or otherwise received in a receptacle 220. The receptacle 220 is part of a plurality of receptacles that move along a conveyor 225. Although a single conveyor 225 with a single line of receptacles 220 is shown in FIG. 2, the system 200 may be comprised of multiple different conveyers 225 with each conveyor 225 having multiple receptacles 220 in a single row.

In some cases, the receptacle 220 includes a weighing mechanism 230. The weighing mechanism 230 may be integrated with the receptacle 220. In other examples, the weighing mechanism 230 associated with or removably coupled to the receptacle 220. Regardless, once the piece of fruit 240 has been placed or otherwise received in the receptacle 220, the actual weight of the piece of fruit 240 may be measured.

The actual weight measurement of the piece of fruit 240 may occur before, during and/or after the receptacle 220 with the piece of fruit 240 passes through the pit detection system 250. In some cases, the pit detection system 250 may be similar to the pit detection system 105 described with respect to FIG. 1. In other cases, the pit detection system 250 may include all or some of the various systems described with respect to the system 100 of FIG. 1.

The pit detection system 250 uses various image capture devices to capture various images of each piece of fruit 240 in each receptacle 220. For example, the receptacle 220 may include an actuation mechanism that moves the piece of fruit 240 to a variety of resting positions within the receptacle 220. As the piece of fruit 240 is moved to the various positions within the receptacle 220, an image capture device may capture an image of the piece of fruit 240. The various images are used to determine a size and/or weight of the piece of fruit. In some examples, the size of the piece of fruit is used to estimate a weight of the piece of fruit (e.g., the weight of the piece of fruit 240 with the pit).

The pit detection system 250 may also analyze the various images to determine whether a pit or pit fragment is still within the piece of fruit. For example, the pit detection system 250 may be trained to recognize a shape of a pit or pit fragment, a size of pit or pit fragment, a color of a pit or pit fragment, a density of a pit of pit fragment and so on.

Once the estimated weight of the piece of fruit is determined, the pit detection system 250 uses the estimated weight of the piece of fruit and the actual weight of the piece of fruit to determine whether the pit has been removed from the piece of fruit 240. For example, the pit detection system 250 determines whether the difference between the estimated weight of the piece of fruit and the actual weight of the piece of fruit meets or exceeds a weight difference threshold (e.g., fifteen percent).

If the weight difference between the actual weight of the piece of fruit 240 and the estimated weight of the piece of fruit 240 exceeds the weight difference threshold, the pit detection system 250 believes the piece of fruit 240 is pit free. As such, the pit detection system 250 causes a fruit actuation mechanism 290A to move the piece of fruit 240 from the receptacle 220 onto a first conveyor 260 for further processing.

However, if the weight difference between the actual weight of the piece of fruit 240 and the estimated weight of the piece of fruit 240 does not exceed the weight difference threshold, the pit detection system 250 has determined that the piece of fruit 240 still contains a pit. As such, the pit detection system 250 causes a fruit actuation mechanism 290B to move the piece of fruit 240 onto a second conveyor 270. In such cases, the pit may be manually removed from the piece of fruit 240.

If the pit detection system 250 cannot determine whether the piece of fruit 240 includes a pit or pit fragment based on the weight difference between the actual weight of the piece of fruit 240 and the estimated weight of the piece of fruit 240, the pit detection system 250 causes a fruit actuation mechanism 290C to move the piece of fruit 240 onto a third conveyor 280.

In some cases, the pit detection system 250 monitors the number of pieces of fruit that are placed on each of the conveyors (e.g., conveyor 260, conveyor 270 and conveyor 280). This information may then be used to adjust or calibrate the weight difference threshold of the pit detection system 250 such as described above. For example, if the pit detection system 250 has ejected over a threshold amount of pieces of fruit down the second conveyor 270 and/or the third conveyor 280 in under a threshold amount of time (e.g., twenty pieces of fruit 240 in the last five minutes), the pit detection system 250 may recalibrate and/or adjust the weight difference threshold. In another example, the pit detection system 250 may provide a notification to a computing device associated with a human inspector that the weight difference threshold should be monitored and/or adjusted.

In addition, each conveyor may have a human inspector that monitors the accuracy of each of the classifications associated with each of the conveyors. For example, the human inspector may determine that the pit detection system 250 has falsely ejected too many pieces of fruit 240 and/or whether too many pieces of fruit with pits have been falsely identified for further processing.

Figure 3:
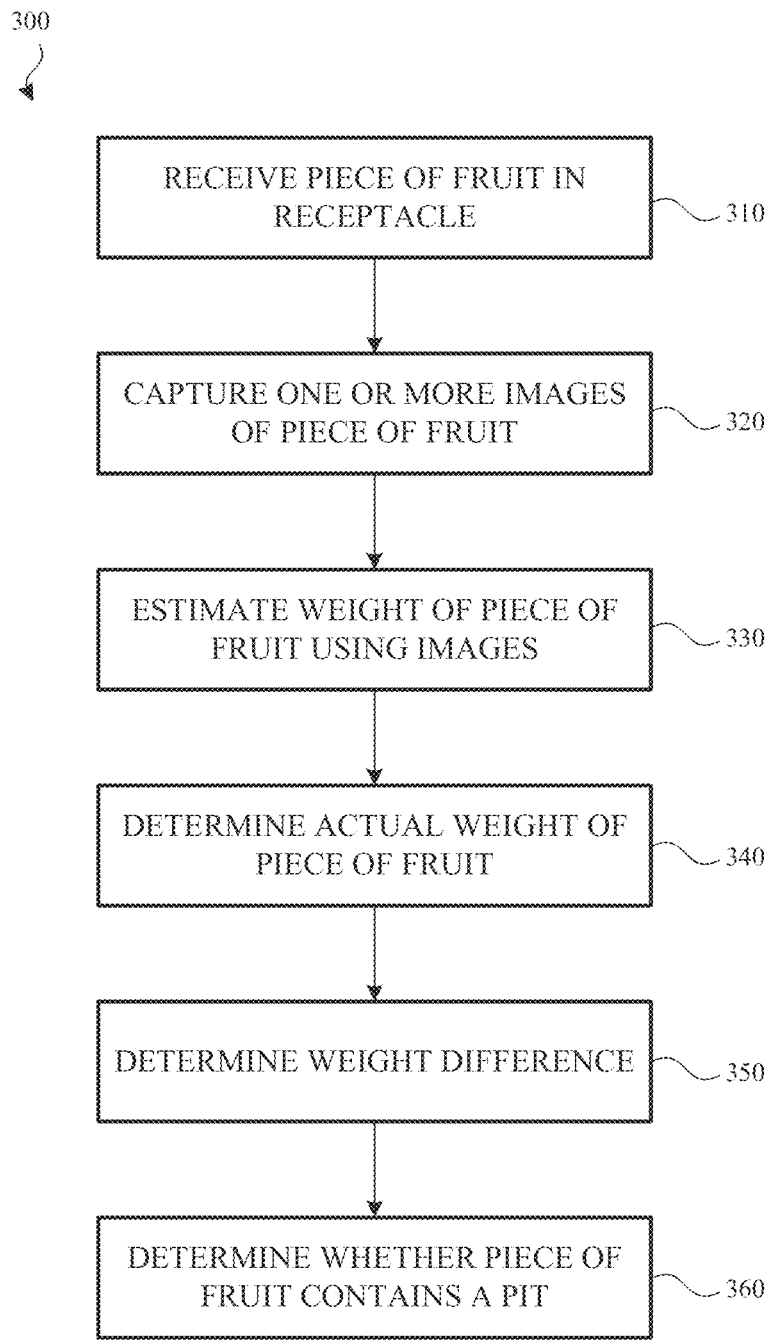
FIG. 3 illustrates a method for determining whether a pit has been removed from a piece of fruit according to an example.

FIG. 3 illustrates a method 300 for determining whether a pit has been removed from a piece of fruit according to an example. The method 300 may be used by the system 100 described above with respect to FIG. 1 and/or the system 200 described above with respect to FIG. 2.

The method 300 begins when a piece of fruit is received (310) in a receptacle. In some examples, the piece of fruit may be placed in the receptacle after undergoing a machine pitting process. As described above, the receptacle may be one of many receptacles that move along a conveyor as the various operations of the method 300 are performed.

Once the piece of fruit has been placed in the receptacle, one or more images of the piece of fruit are captured (320) by one or more image capture devices. In some example, the receptacle contains one or more actuation mechanisms that move the piece of fruit to a number of different positions. As such, different sides of the piece of fruit may be captured and used to determine the size and/or weight of the piece of fruit.

For example, the captured images may be used to determine the size of the piece of fruit. The size may then be used to estimate (330) the weight of the piece of fruit. For example, if a piece of fruit, such as a cherry, has measurements of 24 mm in length, 21 mm in width and 24 mm in height, the cherry may be estimated to weigh approximately 9 grams—with the pit. Although specific measurements and weight are listed, these are for illustrative purposes only. In some examples, the estimated weight of the piece of fruit, although taken after the piece of fruit has been processed by a pitting machine, includes the estimated weight of the piece of fruit plus the pit.

Once the estimated weight of the piece of fruit is determined, a weighing mechanism associated with the receptacle determines (340) the actual weight of the piece of fruit. In some examples, the actual weight of the piece of fruit is the actual weight of the piece of fruit after the piece of fruit has been processed by the pitting machine. Thus, the actual weight of the fruit may include the weight of the pit or a pit fragment.

In order to determine whether the pit has been completely removed from the piece of fruit, the weight difference between the estimated weight and the actual weight is determined (350). A determination (360) may then be made as to whether the piece of fruit contains a pit. For example, if the weight difference is above a weight difference threshold, a determination may be made that the pit has been entirely removed from the piece of fruit. However, if the weight difference is below a weight difference threshold, a determination may be made that the pit has not been completely removed from the piece of fruit. The piece of fruit may then be processed accordingly.

Figure 4:
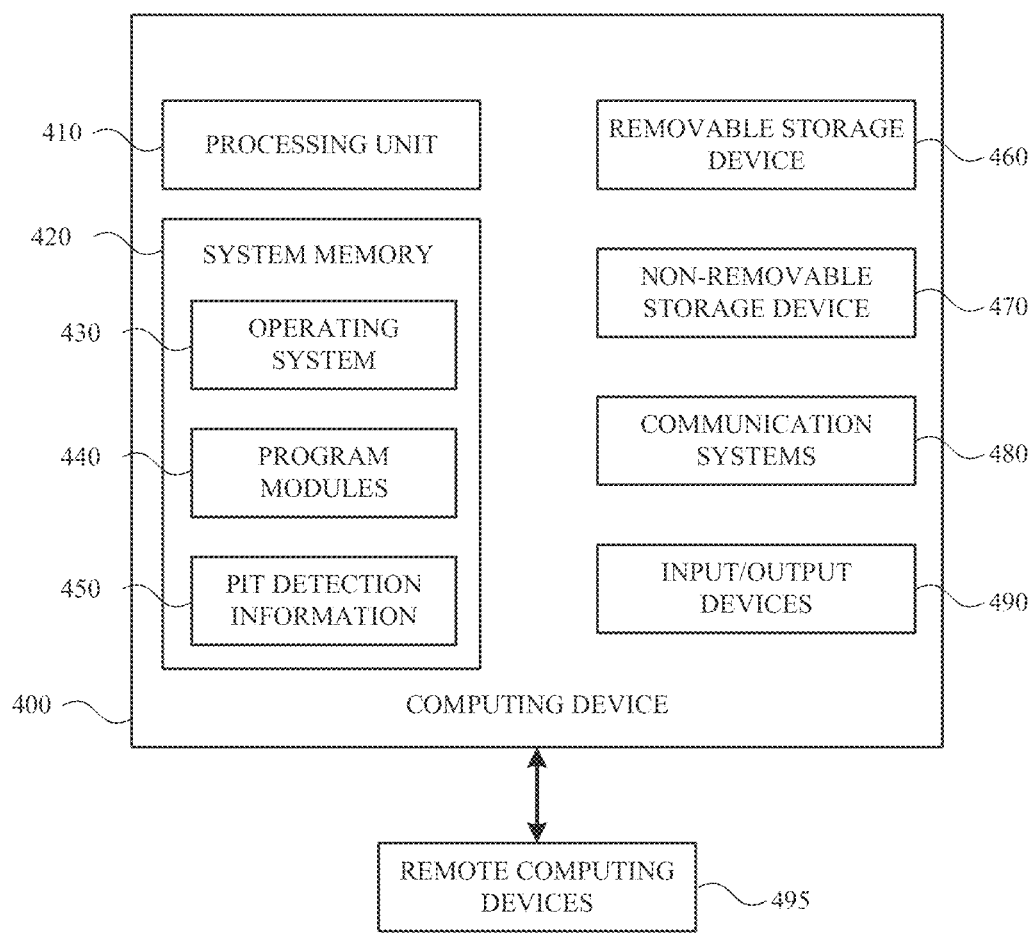
FIG. 4 is a block diagram illustrating example physical components of a computing device with which aspects of the disclosure may be practiced.

FIG. 4 and its associated descriptions provide a discussion of an example computing device that may be used with the various systems described herein. However, the illustrated computing device is an example and is not limiting as a vast number of electronic device configurations may be utilized for practicing various aspects of the disclosure.

FIG. 4 is a block diagram illustrating physical components (e.g., hardware) of a computing device 400 with which aspects of the disclosure may be practiced. The computing device 400 may be integrated or otherwise associated with any of the systems described above with respect to FIG. 1 and FIG. 2. The components of the computing device 400 described below may have computer executable instructions for detecting the presence of a pit in a piece of fruit such as described above.

In a basic configuration, the computing device 400 may include at least one processing unit 410 and a system memory 420. Depending on the configuration and type of computing device, the system memory 420 may comprise, but is not limited to, volatile storage (e.g., random access memory), non-volatile storage (e.g., read-only memory), flash memory, or any combination of such memories. The system memory 420 may include an operating system 430 and one or more program modules 440 or components suitable for performing the various operations described above.

The operating system 430 may be suitable for controlling the operation of the computing device 400. The system memory 420 may also includes pit detection information 450 including, but not limited to, the weight estimation measurement of each piece of fruit, the captured images of each piece of fruit, the actual weight measurement of each piece of fruit, an identification of whether each piece of fruit contains a pit or pit fragment and so on.

The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 460 and a non-removable storage device 470.

As stated above, a number of program modules 440 and data files may be stored in the system memory 420. While executing on the processing unit 410, the program modules 440 may perform the various processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the computing device 400 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 400 may also have one or more input/output device(s) 490. These include, but are not limited to, a keyboard, a trackpad, a mouse, a pen, a sound or voice input device, a touch, force and/or swipe input device, a display, speakers, a printer, etc. The aforementioned devices are examples and others may be used. The computing device 400 may include one or more communication systems 480 that allow or otherwise enable the computing device 400 to communicate with remote computing devices 495. Examples of suitable communication connections include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage device 460, and the non-removable storage device 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. In addition, each of the operations described above may be executed in any order. For example, one operation may be performed before another operation. Additionally, one or more of the disclosed operations may be performed simultaneously or substantially simultaneously.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for detecting whether a piece of fruit contains a pit, comprising:
   receiving, after a fruit pitting process, the piece of fruit in a receptacle, the receptacle having at least one actuation mechanism that automatically changes a position of the piece of fruit within the receptacle from a first position to a plurality of different positions;
   capturing image data of the piece of fruit as the actuation mechanism moves the piece of fruit within the receptacle to the plurality of different positions;
   determining, based at least in part, on the image data, an estimated weight of the piece of fruit, the estimated weight of the piece of fruit comprising the estimated weight of the piece of fruit prior to the piece of fruit undergoing the fruit pitting process;

determining, using a weighing mechanism associated with the receptacle, an actual weight of the piece of fruit; and determining, using a difference between the actual weight of the piece of fruit and the estimated weight of the piece of fruit, whether the piece of fruit contains the pit.

2. The method of claim 1, further comprising determining, based at least in part, on the difference between the actual weight of the piece of fruit and the estimated weight of the piece of fruit, whether the pit is a pit fragment.

3. The method of claim 1, wherein the actuation mechanism automatically changes the position of the piece of fruit within the receptacle from a first position to the plurality of different positions as the receptacle moves from a first position to a plurality of different positions along a fruit processing line.

4. The method of claim 1, further comprising ejecting the piece of fruit from the receptacle when it is determined the piece of fruit contains the pit.

5. The method of claim 1, further comprising ejecting the piece of fruit from the receptacle when it is undetermined whether the piece of fruit contains the pit.

6. The method of claim 1, further comprising adjusting the estimated weight of the piece of fruit based, at least in part, on one or more growing conditions associated with the piece of fruit.

7. The method of claim 1, further comprising receiving a prepitted actual weight of the piece of fruit prior to the fruit pitting process.

8. A system, comprising:
at least one processor; and
a memory coupled to the at least one processor and storing instructions that, when executed by the at least one processor, perform operations, comprising:
  receiving image data of a piece of fruit as the piece of fruit is contained in a receptacle;
  determining, based at least in part, on the image data, an estimated weight of the piece of fruit;
  receiving, from a weighing mechanism associated with the receptacle, an actual weight of the piece of fruit; and
  determining, using a difference between the actual weight of the piece of fruit and the estimated weight of the piece of fruit, whether the piece of fruit contains a pit.

9. The system of claim 8, further comprising instructions for determining, based at least in part, on the difference between the actual weight of the piece of fruit and the estimated weight of the piece of fruit, whether the pit is a pit fragment.

10. The system of claim 8, wherein the image data comprises a plurality of different images of the piece of fruit.

11. The system of claim 10, wherein each of the plurality of different images contain a different view of the piece of fruit.

12. The system of claim 8, further comprising instructions for causing the piece of fruit to be ejected from the receptacle when it is determined the piece of fruit contains the pit.

13. The system of claim 8, further comprising instructions for causing the piece of fruit to be ejected from the receptacle when it is undetermined whether the piece of fruit contains the pit.

14. The system of claim 8, further comprising receiving a prepitted actual weight of the piece of fruit.

15. A method, comprising:
receiving a plurality of images of a piece of fruit as the piece of fruit is contained in a receptacle and after the piece of fruit has undergone a pitting process;
determining, based at least in part, on the plurality of images, an estimated weight of the piece of fruit;
receiving, from a weighing mechanism associated with the receptacle, an actual weight of the piece of fruit; and
determining, using a difference between the actual weight of the piece of fruit and the estimated weight of the piece of fruit, whether the piece of fruit contains a pit.

16. The method of claim 15, further comprising determining, based at least in part, on the difference between the actual weight of the piece of fruit and the estimated weight of the piece of fruit, whether the pit is a pit fragment.

17. The method of claim 15, further comprising altering a position of the piece of fruit within the receptacle as the plurality of images are taken by an image capture device.

18. The method of claim 15, further comprising ejecting the piece of fruit from the receptacle when it is determined the piece of fruit contains the pit.

19. The method of claim 15, further comprising ejecting the piece of fruit from the receptacle when it is undetermined whether the piece of fruit contains the pit.

20. The method of claim 15, further comprising receiving a prepitted actual weight of the piece of fruit prior to the fruit pitting process.

* * * * *